United States Patent [19]
Kirol

[11] Patent Number: 4,727,722
[45] Date of Patent: Mar. 1, 1988

[54] ROTARY MAGNETIC HEAT PUMP

[75] Inventor: Lance D. Kirol, Shelly, Id.

[73] Assignee: The United States of America as represented by the United States Department of Energy, Washington, D.C.

[21] Appl. No.: 13,518

[22] Filed: Feb. 11, 1987

[51] Int. Cl.[4] ............................................. F25B 21/02
[52] U.S. Cl. ................................................. 62/3; 62/6
[58] Field of Search .......................................... 62/3, 6

[56] References Cited

U.S. PATENT DOCUMENTS

| | | |
|---|---|---|
| 3,108,444 | 10/1963 | Kahn . |
| 3,456,184 | 7/1969 | Kopczynski . |
| 3,743,866 | 7/1973 | Pire . |
| 3,828,573 | 8/1974 | Eskeli . |
| 4,005,587 | 2/1977 | Eskeli . |
| 4,033,734 | 7/1977 | Steyert et al. . |
| 4,069,028 | 1/1978 | Brown . |
| 4,107,935 | 8/1978 | Steyert, Jr. . |
| 4,230,963 | 10/1980 | Kurpanek . |
| 4,281,969 | 8/1981 | Doub . |
| 4,392,356 | 7/1983 | Brown . |
| 4,408,463 | 10/1983 | Barclay . |
| 4,441,325 | 4/1984 | Bon-Mardion et al. . |
| 4,459,811 | 7/1984 | Barclay et al. . |
| 4,507,927 | 4/1985 | Barclay . |
| 4,557,667 | 12/1985 | Delassas et al. . |

OTHER PUBLICATIONS

"Basic-Principles & Possible Configurations of Magnetic Heat Pumps", Dr. Gerald Brown, ASHRAE, Inc., 1981, v. 87, Pt. 2.
"Magnetic Heat Pump Feasibility Assessment", Lance Kirol, et al., Published Oct. 1984, EG&G Idaho, Inc.
"Magnetic Refrigerator Development", J. A. Barclay & W. A. Steyert, Electric Power Research Institute-Apr. 1981.

Primary Examiner—Lloyd L. King
Attorney, Agent, or Firm—Joseph P. Krause; Paul A. Gottlieg; Judson R. Hightower

[57] ABSTRACT

A rotary magnetic heat pump constructed without flow seals or segmented rotor accomplishes recuperation and regeneration by using split flow paths. Heat exchange fluid pumped through heat exchangers and returned to the heat pump splits into two flow components: one flowing counter to the rotor rotation and one flowing with the rotation.

8 Claims, 5 Drawing Figures

ROTARY MAGNETIC HEAT PUMP

CONTRACTUAL ORIGIN OF THE INVENTION

The U.S. Government has rights in this invention pursuant to Contract No. DE-AC07-76ID01570 between the Department of Energy and EG&G Idaho, Inc.

BACKGROUND OF THE INVENTION

This invention relates to magnetic heat pumps. Specifically, the invention is a rotary magnetic heat pump used to pump heat energy from a low temperature source to a high temperature sink. The invention also contemplates use as a refrigerator usable to remove heat from a source and pump it into a sink. The term heat pump will be used to indicate both refrigerators and heat pumps hereinafter.

Magnetic heat pumping involves expulsion of heat into a high temperature sink from the magnetic working material through the application of a magnetic field. Subsequent removal of the magnetic field increases entropy of the working material and allows absorption of heat from a low temperature bath. Magnetic refrigerators and heat pumps operate near the ferromagnetic Curie temperatures of working materials and with proper selection of working materials can work at any temperature range from near absolute zero to near 1400 degrees Kelvin. As known in the art, different materials have different Curie temperatures.

At temperatures above 20° Kelvin, in order to obtain useful temperature increases through magnetic heat pumps and to achieve good thermal efficiency it is necessary to use recuperation or regeneration to preheat the working material before magnetization and cool the material before demagnetization. Past attempts to build regenerative or recuperative magnetic heat pumps have included reciprocating designs and rotary designs.

Reciprocating devices, such as that shown in U.S. Pat. No. 4,459,811 and U.S. Pat. No. 4,332,135 have intrinsic problems with regenerator fluid mixing and reduced efficiency since regenerator fluid must change temperatures to store energy. The major problem with building practical rotary designs is devising a method to pump recuperator fluids through a moving wheel. Previous rotary magnetic heat pumps utilized seals in the wheel or housing and/or segmented wheels to accomplish the pumping of heat transfer fluid through the rotating working material. The seals and segmented wheels of previous designs add complexity, do not work well and the added friction and fluid leakage which degades performance significantly detracts from the commercial useability. Frictional heating in the recuperative portions of the wheel is especially detrimental to good thermodynamic performance of magnetic heat pumps.

For example, U.S. Pat. No. 4,107,935, issued to Steyert discloses a rotary magnetic refrigerator using a wheel segmented into spaces through which heat transfer fluid flows radially in tne segments, back and forth. The spacing between the housing and the segmented wheel is "of the order of a few thousandths of an inch" to prevent "any significant flow" of fluid between the rim of the wheel and flow separators forming the wheel segments. The relatively complex design of the segmented wheel and close tolerance fit with the housing limits the practical useability of the refrigerator disclosed. A simpler design, eliminating the segmented rotor and the need for a close fit or fluid seals would be a substantial improvement over existing rotary magnetic heat pump designs.

Accordingly, it is an object of the present invention to provide a magnetic heat pump.

Another object of the invention is to provide a rotary magnetic heat pump.

Another object of the invention is to provide a rotary magnetic heat pump utilizing regeneration and recuperation without the use of cross-flow rotor design or fluid seals.

Yet another object of the invention is to provide a rotary magnetic heat pump eliminating the requirement of seals on the rotor and/or cross-flow rotor design and provide a Carnot efficiency in excess of 70%.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing objects of the invention, there is provided a rotary recuperative magnetic heat pump comprised of a motor driven wheel or rotor having an axis of rotation through its center and mounted in a housing through which there is provided a localized region of high magnetic field adjacent to a localized region of low magnetic field. The wheel is composed of a pre-determined working material in a matrix which allows heat to flow between the wheel and a heat transfer fluid which circulates in the housing in thermal contact with the wheel.

The wheel is rotated by a motor about its axis of rotation in a housing which has a fluid inlet and outlet port for a heat exchanger connected to a high temperature sink and an inlet and outlet port connected to a heat exchanger in a low temperature bath. Recuperator fluid is pumped into the housing by external pumps in the heat exchanger circuits into the inlet ports of the housing and is withdrawn from the housing at the outlet ports such that fluid flowing into the housing from the inlet ports splits into two flow paths. Some fluid pumped into the housing flows counter to the direction of rotation of the wheel and some fluid flows with the direction of rotation of the wheel. Some fluid flowing in the same direction of the wheel is recirculated through the heat exchange means, while some fluid which flows counter to the direction of rotation of the magnetic wheel flows through the regions of high magnetic field and low magnetic field accomplishing the regeneration mentioned. Fluid flowing opposite the wheel rotation acts as a counter flow heat exchanger with the wheel material, recuperatively preheating working material in the wheel before it enters the field and cooling the working material in the wheel before it leaves the field.

DETAILED DESCRIPTION OF THE PREFERRED EMBODIMENT

Figure 1:
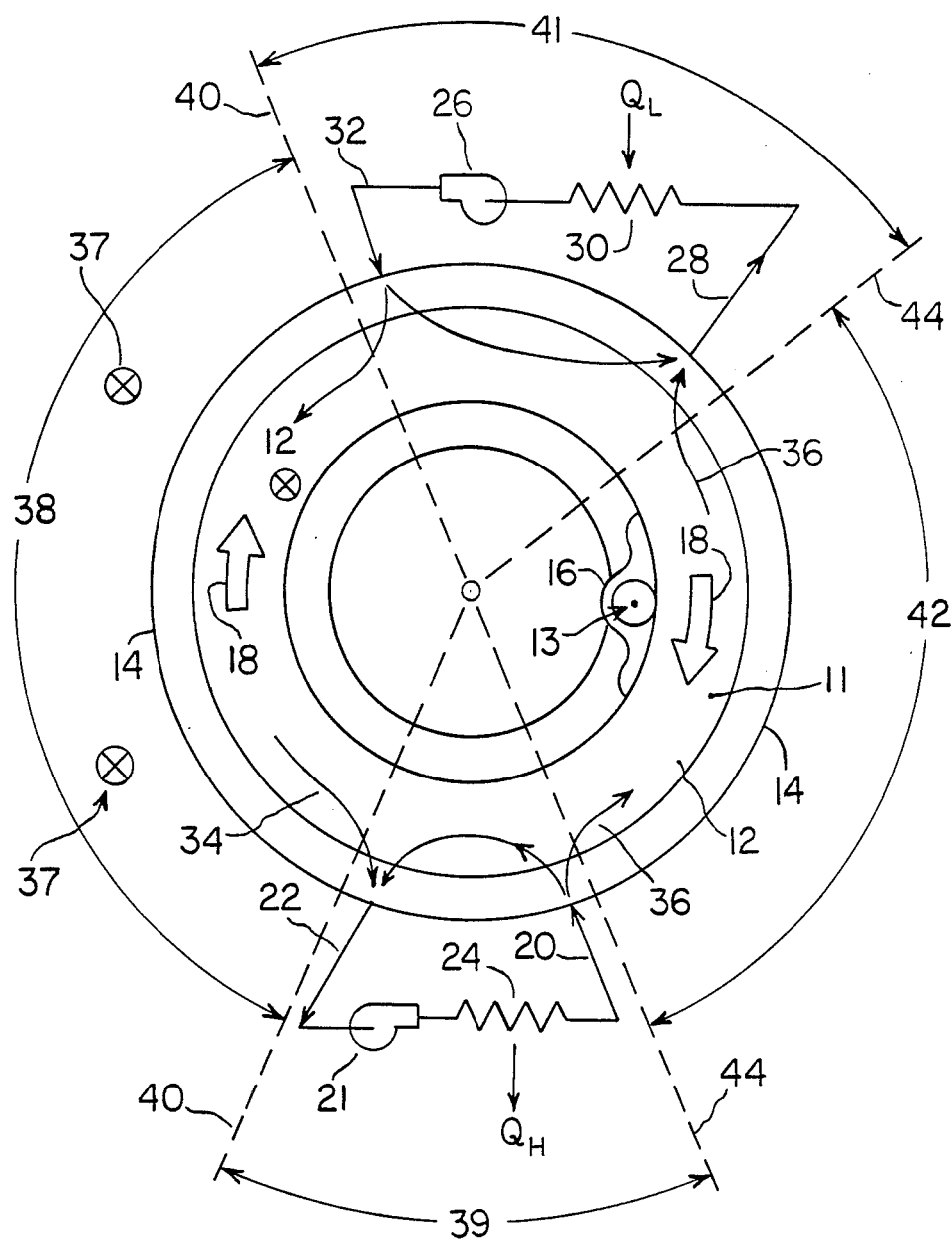
FIG. 1 is a schematic of the heat pump wheel and heat transfer fluid flow paths through heat exchangers and pumps.

Referring to FIG. 1, there is shown a "top view" schematic of the heat pump wheel, heat transfer fluid flow paths, heat exhangers and pumps of the preferred embodiment. A heat transfer fluid is kept in good thermal contact with the magnetic working material, flowing throughout the housing without requiring segmented rotors or precision seals. Good thermal efficiency is achieved by minimizing pressure drop of the heat transfer fluid through the housing. Fluid and mechanical frictional losses in the housing are minimized by the simplified construction, which does not require rotor seals.

Figure 4:
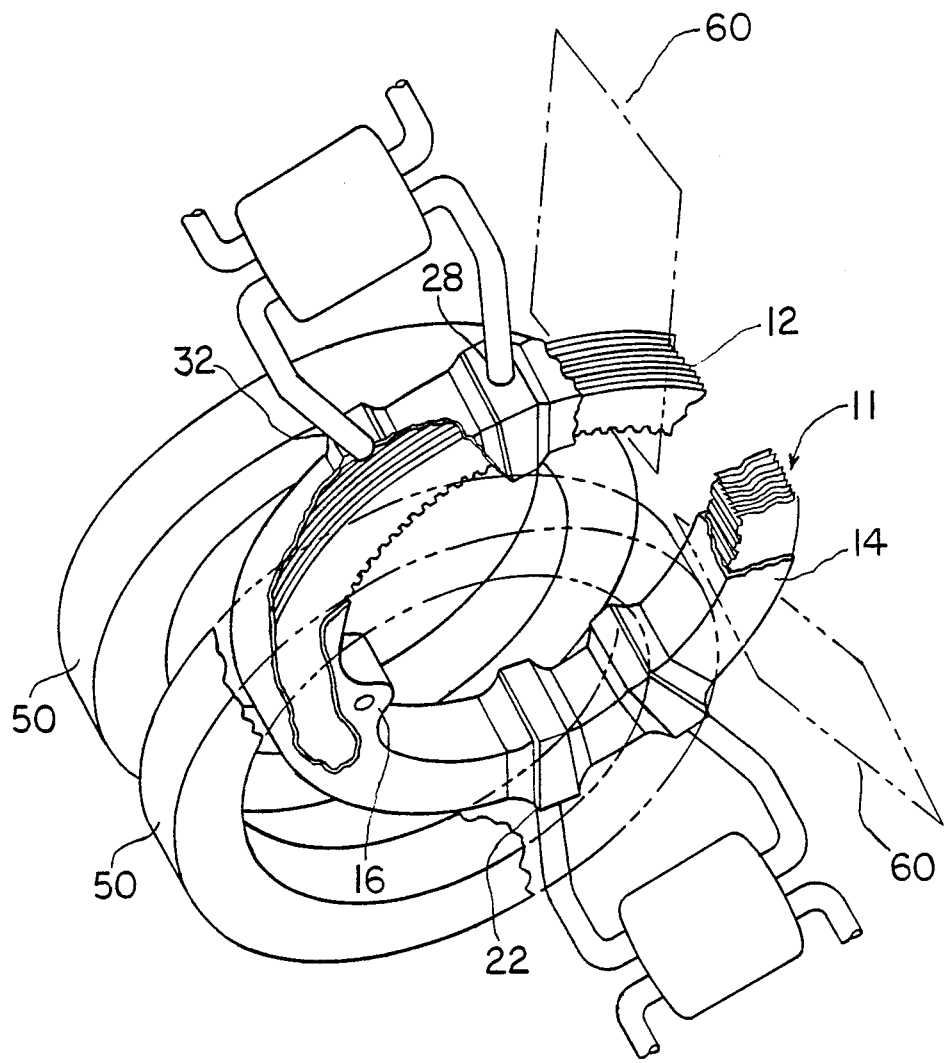
FIG. 4 is an isometric pictorial of the complete rotary recuperative magnetic heat pump.

In FIG. 1, the rotary magnetic heat pump 10 is comprised of a plate or series of plates not shown in FIG. 1, but shown as 11 in FIG. 4, forming a rotor or wheel 12, rotatably mounted in a toroidally shaped or generally toroidally shaped housing 14. Plates 11, forming wheel 12 may be comprisad of any of a family of materials having Curie temperatures appropriately selected for the desired operating temperature range of the heat pump. In general, gadolinium is the most widely used material enhanced by the addition of other constitutent materials to widen temperature operating ranges. The wheel 12 is rotated in housing 14 by means of a motor 16 appropriately coupled to the wheel 12 by, for example, a series of gears or equivalents to rotate the wheel 12 in the direction shown by arrows 18, at a speed in the preferred embodiment of approximately one revolution per second. Wheel 12 may have gear teeth cut on its inner or outer surfaces to permit the direct gearing of motor 16 thereto. A single seal or "O-ring" 13 may be required between the motor 16 and housing 14 to prevent the heat transfer fluid from leaking from the housing 14.

The housing 14, being substantially toroidal in shape has a clearance between its inner surface and the outer edges of wheel 12 of a few thousandths of an inch so that working fluid flow is between the plates 11 forming the wheel 12 as much as possible. However, no seals are needed between the wheel 12 and the housing at any point. The housing 14 is equipped with inlet ports 20 and 32 and outlet ports 22 and 28 as shown in FIG. 1. In the preferred embodiment the ports are designed so fluid actually enters and exits on both the inner and outer peripheries of the wheel 12 as shown in FIG. 4.

A magnetic field 37 shown schematically using dots and "X's" notation is orthogonl to the plane of wheel 12, but possibly parallel to the wheel in other embodiments. Magnet field 37 is generated by external magnets 50, not shown in FIG. 1, but shown in FIG. 4, and exists substantially only in the region bounded by phantom lines 40 swept out by arc line 38. The souce of the magnetic field 37 is not critical, and may be generated by any appropriate means either a super conducting magnetic or a permanent magnet as desired. It is desirable that the magnetic field change gradients near the regions of both phantom lines 40 be kept as large as possible to improve magnetic entropy change; a larger field change gradient permitting greater magnetocaloric effect upon the working material in wheel 12.

The heat transfer fluid, water in the preferred embodiment, is circulated through a low-temperature-bath heat exchanger 30, which absorbs heat at $Q_L$, by means of a circulating pump 26 connected between outlet port 28 and inlet port 32. A high temperature heat exchanger 24, which transfers heat into a load at QH has working fluid circulated through it by circulating pump 21 which is connected to the housing 14 from outlet port 22 to inlet port 20.

A low magnetic field region, exists between phantom lines 44 indicated by arc line 42 which may be enhanced by appropriate shielding means 60, as shown in FIG. 4 to separate stray fields from the magnets 50.

As shown in FIG. 1, fluid is pumped into the wheel housing 14 through inlet port 32, after passing through the low temperature bath heat exchanger 30 by circulating pump 26. Most of the fluid pumped into housing 14 through port 32 flows with the direction of rotation 18 of the wheel 12 to the nearby outlet port 28 which is at a slightly lower pressure, P-dp. Working fluid is also pumped into the housing 14 through inlet port 20 after passing through the high temperature heat sink heat exchanger 24 by means of circulating pump 21. Similarly, most of the fluid pumped into the housing 14 through port 20 by pump 21 flows with the direction 18 of the rotation of the wheel 12 to nearby outlet port 22, port 22 being at a slightly lower pressure P-dp.

The pressure at inlet port 20 and the pressure at inlet port 32 are approximately equal and are both slightly higher than the outlet pressure at outlet ports 22 and 28 respectively. Some fluid therefore also flows against the wheel rotation 18 in the direction opposite to the wheel rotation indicated by arrows 36 and 34.

Working fluid entering the housing 14 through inlet port 20 and entering the housing 14 through inlet port 32 splits into two flow paths indicated by the direction of arrows 24 and 26 and flows counter to the direction of rotation of wheel 12 because there are no seals or other limiting devices to prohibit or limit the flow of the working fluid in one direction. By appropriate spacing of inlet ports 20 and 32 with respect to outlet ports 22 and 28, the proportion of the fluid entering the housing 14 and flowing against the direction of rotation with respect to the portion of the fluid flowing with the direction of rotation entering the housing 14 can be adjusted to achieve recuperation heat transfer. The split flow paths, i.e. the flow entering housing 14 through the inlet ports splitting into portions that travel with the rotation of the wheel and against the rotation of the wheel, accomplish recuperation improving the efficiency of the heat pump, making large temperature lifts possible, as well as simplifying the construction by elimination of the use of seals or extremely close tolerance fits between the wheel 12 and housing 14.

In FIG. 1, the portion of the wheel swept out by arc line 38 is subject to a high magnetic field, 37 and the portion of the wheel 12 swept out by arc line 42 is subject to a low magnetic field preferably near zero. Between ports 20 and 22, i.e., the region swept by arc line 39, the wheel is an increasing magnetic field region; the portion of the wheel between 32 and 28, i.e., the region swept out by arc line 41 is experiencing a decreasing field region.

As the wheel 12 rotates in the direction shown, 18 as in housing 14, by motor 16, fluid is pumped through two recirculating paths by circulating pumps 21 and 26. Working fluid is pumped through the low temperature heat exchanger 30, transferring heat at $Q_L$, by means of circulating pump 26 which obtains working fluid from the housing 14 through outlet port 28 and returns the fluid to the housing through inlet port 32. Similarly, working fluid is circulated through a high temperature heat exchanger 24 transferring heat at QH by means of circulating pump 21 which draws working fluid through outlet port 22 and returns working fluid to the housing 14 through inlet port 20. Heat is rejected into the high temperature sink by heat exchanger 24 and absorbed from the low temperature source by heat exchanger 30.

Magnetic working material of wheel 12, rotating with the direction 18, at the region near input port 20 enters the magnetic field 37 at a temperature $T_H$ and fluid entering the housing 14 through inlet port 20 is at a slightly high temperature $T_H+dT$. Due to the magnetocaloric effect, the temperature of the working material increases as it rotates from the region near port 20 to the region near port 22 until it is higher than the fluid temperature at which temperature, heat begins to be transferred from the working material in wheel 12 to the fluid. As the working material in wheel 12 and the fluid move from the region near port 20 to port 22 the temperature of both increases until at port 22 working material is at temperature $T_H'$ and the fluid is at a very slightly lower temperature.

Figure 2:
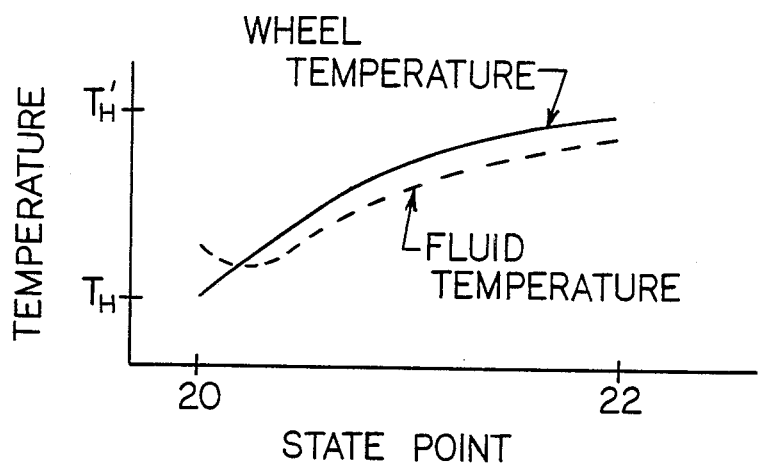
FIG. 2 is a temperature profile for working material and heat transfer fluid as the working material enters the magnetic field.

A typical temperature history of working material and fluid moving from port 20 to 22 is shown in FIG. 2. Fluid leaving the wheel at port 22 is pumped by circulating pump 21 through the heat exchanger 24 where heat is released to the high temperature sink. Heat released is the useful load in the case of a heat pump and is the reject heat in the case of a refrigerator.

Working material leaving the area near port 22 is in thermal contact with fluid flowing from inlet port 32 to outlet port 22. Fluid leaves outlet port 32 at a lower temperature, slightly below $T_L$. As fluid pumped by circulating pump 26 from outlet port 32 splits, the portion of the fluid flowing counter to the direction of wheel 12 is heated as the working material in wheel 12 is cooled such that at port 22 fluid is heated to nearly $T_H'$ and at 32 the working material is at $T_L$. Fluid pumped into the wheel at 32 is at a temparture slightly below $T_L$ and most of this fluid flows with the wheel to outlet port 28. As the wheel begins to leave the magnetic field, it begins to cool due to the magnetocaloric effect until the working material in wheel 12 is colder than the fluid passing between inlet port 32 and outlet port 28. Heat is then transferred from the working fluid to the working material. Both the working fluid and the working material in wheel 12 temperatures continue to drop slightly until at outlet port 28 where the temperature change of the magnetic material in wheel 12 is completed at which point the temperature of material in wheel 12 is at $T_L$. The fluid exiting the wheel at outlet port 28 passes through heat exchanger 30 where it absorbs heat from the low temperature reservoir.

The portion of the fluid entering inlet port 20 by means of circulating pump 21 after passing through the high temperature heat exchanger 24 that flows in the direction opposite the wheel 36 is hot and this fluid is cooled against the wheel 12 until at outlet port 28 the fluid originating from inlet port 20 is very nearly equal to the temperature $T_L'$ prime. The wheel temperature between outlet port 28 and inlet port 20 is increased by the heat absorbed from the fluid flowing against the direction of the wheel rotation from inlet port 20 so at inlet port 20 the temperature has increased to $T_H$ as mentioned above.

In the two constant field sections, i.e. the sections between inlet port 20 and outlet port 28, and the section of the wheel between outlet port 22 and inlet port 32 recuperation occurs. The product of the mass of the fluid times the enthalpy change for the fluid must very nearly equal the mass of the wheel times the enthalpy change for the wheel. The flow split between the recuperator and field change sections at inlet port 20 and inlet port 32 is a function of wheel speed, spacing of the flow ports and the angle and velocity at which fluid is injected into the wheel. Typically, 10% of the injected fluid flows through the recuperator counter to the wheel rotation but the magnitude of the flow split is not critical as long as total flow is adjusted to give the required enthalpy balance.

Flow opposite to wheel motion in the recuperative sections, i.e. between inlet port 20 and outlet port 28 and inlet port 32 and outlet port 22 occurs because the pressure drop of fluid flowing from the inlet ports to the outlet ports is approximately equal to the fluid pressure drop between inlet port 20 and 22 and inlet port 32 and outlet port 28.

Figure 3:
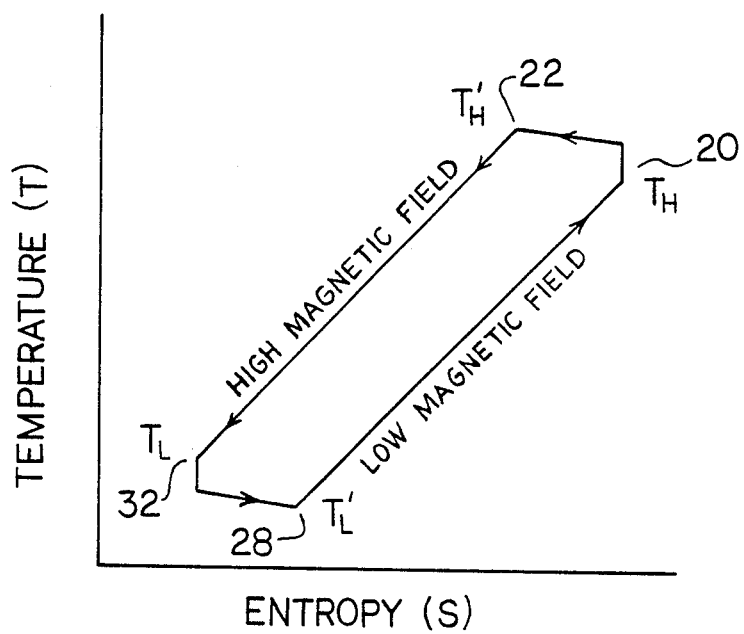
FIG. 3 is a temperature entropy diagram for a heat pump cycle executed by this invention.

FIG. 3 is a typical temperature entropy (T-S) diagram for the cycle. Locations and temperatures shown correspond to those in FIG. 1. At point 20 working material at a temperature $T_H$ enters the magnetic field. Going to port 20, the magnetic material begins to heat up as it is magnetized, then heat transfer from working material to fluid prevents the temperature rise normally associated with magnetization, so a nearly isothermal entropy reduction and magnetization is achieved. Heat equal to the integral of T dS from 20 to 22 is rejected to the high temperature reservoir. From 22 to 32 working material is cooled in a constant high magnetic field by heat exchange with recuperator fluid flowing counter to the direction of rotation from outlet port 32. At port 32 the magnetic working material begins to leave the magnetic field and cools until it begins to absorb heat from the fluid. Enough heat is absorbed by the working material from the fluid between 32 and 28 to give nearly isothermal demagnetization. Heat absorbed is equal to the integral of T ds from 32 to 28. Between points 28 and 20, working material is heated in a constant low field or a zero field by heat exchange with a counter flowing fluid entering the housing 14 from inlet port 20.

FIG. 4 shows a isometric view of the complete magnetic heat pump. In this example for this Figure the wheel 12 is built of thin flat disks or plates 11 of magnetic working material with thin spaces between. Small spacers between the disks maintain proper clearance. It is possible to use spacers between plates 11 because this invention does not require fluid seals in the wheel. Plates are typically 0.003 inches thick with 0.005 inch spacing between but other dimensions are possible. A wheel composed of flat plates is nearly optimum in that heat transfer is very high and pressure drop of working fluid flowing between plates is low but other wheel designs are possible. Working material in the wheel 12 could be woven wires screens, a packed bed of particles or any other configuration that would allow space for fluid flow.

The wheel 12 turns in housing 14 by means of motor 16. The clearance between the housing and the wheel being a few thousands of an inch insures that most fluid flow is between and in good thermal contact with the plates 11 of the wheel 12. As mentioned no seals are needed between the wheel 12 and housing 14. In FIG. 4 the magnets 50 (not shown in FIG. 1) are provided to subject a portion of the wheel to a high magnetic field. These magnets 50 can be superconducting magnets, conventional electro-magnets or permenent magnets as desired. The position and arrangement of the magnets is designed to give a constant high field between ports 22 and 32, and a low field between ports 20 and 28. The magnet arrangement with FIG. 4 is only an example. Other magnet arrangements are possible including other orientations of the magnetic flux lines.

As mentioned above, inlet ports 20 and 28 and outlet ports 32 and 22 are desilned so fluid can enter and exit on both inner and outer peripheries of the wheel 12. Fluid pumped by circulating pumps 21 and 26 flows between the plates of the wheel, with most of the fluid flowing in the path of least resistance, i.e., in the direction of the wheel rotation to the respective outlet ports. Fluid flowing between ports 20 and 22 transfers heat of magnetization of the wheel 12 to the working fluid which thereafter flows through heat exchanger 24 to be dumped into the high temperature stream. Fluid exiting the housing 14 at outlet port 22 flows through pump 21 then through heat exchanger 24 and returns to the housing through inlet port 20. A portion of the fluid entering inlet 20 flows through outlet port 28 flowing against the rotation of the wheel. Heat transfer fluid is also pumped into the housing at inlet port 32. This fluid splits with most of the fluid flowing to outlet port 28 as indicated. Heat magnetization is added to the working material as it cools in the decreasing magnetic field region between ports 32 and 28. Flow exiting at outlet port 28 passes through pump 26 and heat exchanger 30 at a temperature lower than the temperature of the low temperature heat source.

Figure 5:
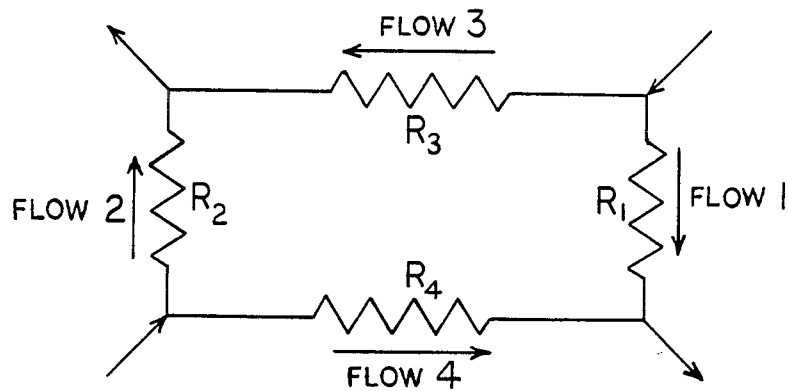
FIG. 5 is a resistance network representative of heat transfer fluid flow paths through the working material wheel.

The flow split at each inlet and outlet port can be determined by considering a flow resistance electrical equivalent as shown in FIG. 5. Resistors R1 and R2 represent the sections where flow is in the same direction as rotation and resistances R3 and R4 represent the sections where flow is in the opposite direction to the wheel rotation. The heat exchanger resistances R1 and R2 are relatively small because the flow paths are shorter and the flow is in the same direction as wheel rotation. Resistances R3 and R4 are larger because of longer flow paths and flow is in the direction against wheel rotation. For proper recuperation flow 2 should equal flow 3 and since the same pressure drop acts across all resistances R3 equals R4. Relative flows are given by flow 1 over flow 2 equal to R2 over R1.

The bulk dimensions of the wheel 12 and housing 14 are not critical to the thermal efficiency of the heat pump, but effect heat pumping capacity. By using a computer model, it was determined that the distance swept out by arc lines 38 and 42 should be approximately equal and four times the distance swept out by are lines 29 and 41. Similarly, a computer model of the heat pump 10 shown in FIG. 1, predicts a Carnot efficiency of at least 80%.

The heat transfer fluid used can be either gas or a liquid, liquid being the preferable alternative. The desired characteristics of the heat transfer fluid are large heat capacity per unit volume and low viscosity. Water is nearly ideal but other fluids could be used as well. At temperatures significantly above or below ambient temperatures, fluids other than water, which are liquid at practical pressures would be chosen.

The embodiments of this invention in which an exclusive property or privilege is claimed are defined as follows:

1. A rotary magnetic heat pump comprised of:

at least one circular plate comprised of predetermined material, having a central hole and an axis of rotation through said hole;

a substantially toroidal shaped housing having first inlet and outlet ports and having second inlet and outlet ports and with said at least one circular plate being rotatably mounted in said housing;

means for inducing a localized strong magnetic field throughout the interior portion of said housing substantially between said first inlet and said second outlet port;

means for rotating said, at least one circular plate in a predetermined direction in said housing on said axis of rotation of said at least one circular plate;

a heat transfer fluid at least in said housing, in thermal contact with said at least one circular plate;

thermal load exchange means in combination with a first pumping means, said combination operatively connected to said first inlet port and said first outlet port to permit transfer of said heat transfer fluid through said first outlet port, through said thermal load exchange means and through said first pumping means and return to said housing through said first inlet port;

a heat rejection means in combination with a second pumping means, said combination operatively connected to said second inlet and said second outlet port to permit the transfer of said heat transfer fluid through said second outlet port, through said heat rejection means, through said second pumping means, to said housing through said second inlet port;

said housing and said at least one circular plate being of a size and said ports being prepositioned in said housing whereby said heat transfer fluid flows in said housing through said first inlet port and splits into first and second flow portions such that said first flow portion flows against the direction of rotation of said plates and said second portion flows with the direction of rotation of said plates, fluid flowing into said housing through said second inlet port splits into third and fourth fluid flow portions such that said third fluid flow portion such that said third fluid flow portion flows against the rotation of said plates and said forth fluid flow portion flows with said rotation.

2. The apparatus of claim 1 having a plurality of circular plates comprised of predetermined material, each plate having a central hole and the same axis of rotation through said hole.

3. The apparatus of claim 2 where said inlet po.:ts and said outlet ports are spaced apart on said housing such that the distance between said first outlet and second inlet equals the distance between said second outlet and said first inlet, said distance is approximately four times the distance between said first inlet and first outlet, and second inlet and second outlet.

4. The apparatus of claim 3, where said means for rotating said plate in said housing rotates said plate in a direction such that said first fluid flow portion entering said housing from said first inlet port and flowing counter to the direction of said rotation enters said localized magnetic field.

5. The apparatus of claim 4 where said heat transfer fluid is water.

6. The apparatus of claim 5 where said means for rotating said plates in said housing includes a drive gear on the inner surface of said plate in combination with a motor.

7. The apparatus of claim 6 where said means for rotating said plates in said housing includes a central drive shaft on the axis of rotation of said at least one circular plate.

8. A method of pumping heat from a low temperature reservoir to a high temperature reservoir comprised of the steps of:
- providing at least one circular plate comprised of predetermined material, having a central hole and an axis of rotation through said hole;
- providing a substantially toroidal shaped housing having first inlet and outlet ports and having second inlet and outlet ports and with said at least one plate being rotatably mounted in said housing;
- providing means for inducing a localized strong magnetic field throughout the interior portion of said housing substantially between said first inlet and said second outlet port;
- providing means for rotating said, at least one circular plate in a predetermined direction in said housing on said axis of rotation of said at least one circular plate;
- providing a heat transfer fluid at least in said housing, in thermal contact with said at least one circular plate;
- providing thermal load exchange means in combination with a first pumping means, said combination operatively connected to said first inlet port and said first outlet port to permit transfer of said heat transfer fluid through said first outlet port, through said thermal load exchange means and through said first pumping means and return to said housing through said first inlet port;
- providing a heat rejection means in combination with a second pumping means, said combination operatively connected to said second inlet and said second outlet port to permit the transfer of said heat transfer fluid through said second outlet port, through said heat rejection means, through said second pumping means, to said housing through said second inlet port;
- said housing and said at least one circular plate being of a size and said ports being prepositioned in said housing whereby said heat transfer fluid flows in said housing through said first inlet port and splits into first and second flow portions such that said first flow portion flows against the direction of rotation of said plates and said second portion flows with the direction of rotation of said plates, fluid flowing into said housing through said second inlet port splits into third and fourth fluid flow portions such that said third fluid flow portion flows against the rotation of said plates and said forth fluid flow portion flows with said rotation:

* * * * *